United States Patent Office 3,224,984
Patented Dec. 21, 1965

3,224,984
PROCESS OF PREPARING EXPANDED POLY-
STYRENE CONTAINING A POLYOLEFIN
Alec N. Roper, Sale, and Edward G. Barber, East Dids-
bury, Manchester, England, assignors to Shell Oil Com-
pany, New York, N.Y., a corporation of Delaware
No Drawing. Filed Jan. 2, 1963, Ser. No. 248,882
Claims priority, application Great Britain, Jan. 2, 1962,
146/62
7 Claims. (Cl. 260—2.5)

The present invention is concerned with cellular poly-
meric material comprising essentially polystyrene or simi-
lar poly(vinylaromatic) compounds, with the preparation
thereof, and with the preparation of compositions suitable
for use in the preparation of such cellular polymeric ma-
terial.

Cellular polymeric material as just referred to may be
prepared in many ways. In one useful method a suit-
able vaporizable expanding agent is incorporated in a
poly(vinylaromatic) compound which is in particulate
form. The resulting "expandable" particles can subse-
quently be expanded to, for example, 30 to 40 times their
original volume by heat treatment which vaporizes the
expanding agent. A mass of such expanded particles can
be fused together in a closed mold to form a polymeric
material of cellular structure, a minor amount of further
expansion taking place during such molding. The word
"particle" as used in this context includes beads, pearls,
nibs, granules, powder and other sub-divided forms of the
poly(vinylaromatic) composition. If desired, all the ex-
pansion and the fusion to a shaped article can be effected
in one stage by heating a mass of expandable particles,
but for technical reasons it is often preferable to effect
pre-expansion in a separate stage.

The present invention is concerned with cellular poly-
meric material formed by processes in which expansion
is brought about by the physical process of vaporization
of a vaporizable expanding agent, incorporated in par-
ticles of polystyrene or other similar poly(vinylaromatic)
composition. The present invention includes the prepara-
tion of expandable poly(vinylaromatic) incorporating
such an expanding agent and also "pre-expanded" poly
(vinylaromatic) obtained by partially expanding expand-
able poly(vinylaromatic), as well as cellular polymeric
material obtained either from expandable poly(vinylaro-
matic) directly or from pre-expanded poly(vinylaro-
matic).

This invention is based on the discovery that unex-
pectedly advantageous results can be obtained in the pro-
duction of cellular material from a poly(vinylaromatic)
composition when the latter contains intimately distrib-
uted therein very small amounts in the range between
0.01 and 0.5% and preferably less than about 0.1%, by
weight, of an organic resinous polymeric substance. The
term "resinous" has the usual meaning in the art and
denotes a polymeric substance which is not an elastomer.
Suitable resinous polymeric substances are polyolefin
waxes and similar polymers and copolymers of vinyl
monomers. The improved results are evidenced by pro-
duction of a more acceptable expanded product having
more uniform cell size and distribution, and by a more
rapid pressure drop when shaped cellular products are
formed by molding a mass of pre-expanded particles of
the poly(vinylaromatic) compositions of this invention.

In its broadest aspects the present invention is char-
acterized by the use, in a process for the manufacture of
cellular polymeric material in which expansion to cellular
form is effected with the aid of a vaporizable expanding
agent incorporated in the polymer, of a poly(vinylaro-
matic) composition containing 0.01 to 0.5% by weight
of an organic resinous polymeric substance intimately dis-
tributed therein in finely divided form, the organic resin-
ous polymeric substance existing as a separate, non-con-
tinuous phase in said poly(vinylaromatic) compound at
temperatures of the order of the temperature at which ex-
pansion is carried out.

According to one aspect of the present invention a
process for preparing an expandable poly(vinylaromatic)
composition comprises polymerizing a monomeric vinyl-
aromatic compound containing in dispersion about 0.01
to 0.5% by weight of a polyolefin wax or similar organic
resinous polymeric substance and incorporating a vapor-
izable expanding agent in the resulting poly(vinylaro-
matic) composition. The polyolefin wax or similar poly-
mer will be present as a separate non-continuous phase,
comprising discrete masses of organic resinous polymer
intimately distributed in the resulting poly(vinylaromatic)
compound at temperatures of the order of the tempera-
tures at which expansion of the resulting expandable poly-
mer is carried out.

According to another aspect of the present invention a
process for preparing a particulate pre-expanded poly(vi-
nylaromatic) composition comprises subjecting a partic-
ulate expandable poly(vinylaromatic) composition, pre-
pared in the manner just defined, to expansion conditions
to form an expanded product, and thereafter maturing
said expanded product until the gas pressure therein is
substantially atmospheric.

According to a further aspect of the present invention
a process for preparing a shaped mass of cellular poly-
meric material comprises confining particles of a pre-ex-
panded poly(vinylaromatic) composition, prepared in the
manner just defined, in a closed mold, heating said par-
ticles to effect expansion and fusion thereof to form a
shaped mass within said mold, and thereafter cooling said
mass to reduce the gas pressure therein prior to discharg-
ing said shaped mass from said mold.

The degree of intimate distribution required is most suit-
ably obtained by polymerizing the monomeric vinylaro-
matic compound containing the organic resinous poly-
meric substance in dispersion (i.e., solution or suspen-
sion) therein. This is the preferred way of preparing the
poly(vinylaromatic) compounds used in carrying out the
present invention, since it assures that the resulting poly
(vinylaromatic) compound contains the very small
amount of resinous polymeric additive in the required
homogeneous distribution of very small discrete masses.
The present invention is thus distinguished from the con-
cept of mechanically blending appreciable quantities, e.g.
over 1% and up to 10% or more of polymeric additives,
such as elastomers, e.g., polyisobutylene and rubber diene
polymers, or resinous polymeric materials, e.g., polyvinyl
chloride and copolymers of styrene with acrylic esters or
acrylonitrile, into poly(vinylaromatic) compositions prior
to the preparation of cellular material. The addition of
such quantities of such polymeric additives would result
in formation of a modified product in the sense that the
general characteristics of the poly(vinylaromatic) com-
pound base material would be changed in a manner de-
pending on the particular additive used. In contrast the
present invention results in no significant change in the
general characteristics of the poly(vinylaromatic) poly-
mer itself, but effects an important improvement in the
processability of polyvinylaromatics into cellular prod-
ucts.

While the present invention is not to be restricted by
any theory of how it is effective, it is believed that the
improvement obtained in accordance with this invention
is due to the small amount of polymeric additive used and,
equally important, to the uniform distribution of the addi-
tive as small, discrete masses in the poly(vinylaromatic)
compound. It has been found from microphotographic data obtained under polarized light that the polymeric additive is present in compositions of this invention as a separate non-continuous phase comprising a very large number of discrete masses distributed therein, even at temperatures of the order of the temperature at which expansion is carried out. It appears that the presence of "nuclei" of additive in the poly(vinylaromatic) composition during the expansion tends to promote expansion in a greater number of individual locations within the poly(vinylaromatic) compound than when such nuclei are absent. This results in a more homogeneous cellular product having more cells of much smaller size per unit volume than is usual in conventional cellular material, which in itself is a useful result from the appearance and thermal insulation aspects.

Thus, it is possible, in accordance with the present invention, to produce low bulk density cellular polystyrene having an average cell size, considered as the diameter of a spherical cell, below 95 microns, e.g., 80 microns. This compares with cell sizes of the order of 130 microns and higher, conventionally obtained in the art. The "apparent" bulk density of the low cell size cellular polystyrene which can be produced in accordance with the present invention by at least a thirtyfold expansion of expandable particulate polystyrene is of the order of 1 pound per cubic foot. It also appears that the separate, non-continuous resinous polymeric additive phase, which persists at temperatures below the expansion temperature, has the effect of providing what might be called "microcracks" in the poly(vinylaromatic), composition. These would allow gas and/or vapor within the solidified polymer to escape more quickly. As is known in the art it is necessary, when forming such articles by confining a mass of pre-expanded particles in an enclosed mold and heating the mass to effect some further expansion and fusion to a composite whole, to leave the shaped cellular article in the mold until the internal pressure within the article is reduced by the diffusion of gas and/or vapor therefrom. If this is not done and the mold is opened too soon, the shaped article will distort and even split as the result of disruptive internal pressures. The time hitherto required for pressure reduction has placed a handicap on the economical production of shaped cellular articles in the art. The present invention, in providing means whereby the period required for pressure reduction in the molding cycle is shortened, therefore provides an important technical advance in the art from the point of view of rendering the mass production of shaped cellular articles more economic. It is indeed surprising that the incorporation of such small amounts of polymeric substances in polyvinylaromatic compounds in accordance with the present invention can achieve this result and at the same time produce a more acceptable cellular product from the point of view of improved homogeneity and smaller cell size, without significantly changing the general characteristics of the poly(vinylaromatic) compound.

As indicated above, it is believed that this surprising result depends on the formation of a very fine distribution of discrete masses of the polymeric resinous substances, used according to this invention, in the poly(vinyalaromatic) composition. This distribution is of the order of fineness which results when the poly(vinylaromatic) is produced by polymerizing a monomeric vinylaromatic compound containing the polymeric substance in dispersion therein. It is therefore preferable to produce an expandable poly(vinylaromatic) composition in accordance with the present invention by polymerization in this way. It is preferred to produce the polymer compositions of this invention by aqueous suspension polymerization technique, followed by or in conjunction with incorporation of the vaporizable expanding agent, which is advantageously pentane. The vaporizable expanding agent can be incorporated either in a separate operation, e.g., by supplying said expanding agent to an aqueous suspension of the poly(vinylaromatic) composition in particulate form at temperatures below, at, or above the softening temperature thereof, or alternatively in conjunction with suspension polymerization by supplying said expanding agent to the polymerization vessel at a suitable stage in the polymerization at which polymerization has already proceeded to an extent such that discrete masses comprising poly(vinylaromatic) compound are present in suspension in the aqueous polymerization medium.

It has been found when using suspension polymerization technique that good results can be obtained using a suspension system comprising both an inorganic and an organic suspension stabilizer, e.g., bentonite and poly(vinylalcohol), since in this way the poly(vinylaromatic) composition can be produced as beads of optimum size. It is, however, equally possible to use other suspension systems, such for example as those in which the suspension is stabilized with the aid of either an inorganic or an organic suspension stabilizer alone.

It is also possible to produce the poly(vinylaromatic) compound by a mass or bulk polymerization process from monomer containing the required polymeric substance in dispersion, and thereafter to incorporate the expanding agent, e.g., by supplying said agent to an aqueous suspension of particulate poly(vinylaromatic) composition or by supplying said agent to a closed vessel, advantageously an extruder, in which the poly(vinylaromatic) composition is brought to a heat-plastified condition and mechanically worked in order to permit absorption of said expanding agent.

In general, therefore, polymerization can be effected by any suitable suspension-, emulsion- or bulk polymerization technique, usually with the aid of a catalyst. Expansion of the particulate poly(vinylaromatic) composition containing dispersed therein not more than about 0.5% by weight of said organic polymeric substance, rendered expandable by incorporating a vaporizable expanding agent therein, can be carried out in any suitable manner. Expansion is preferably effected by steam treatment, e.g., by passing the expandable particles countercurrent to live steam in an elongated expansion zone, at about 100° C. or at somewhat higher temperatures, up to about 120° C.

This invention provides a means of producing improved, expanded polystyrene or related polymers by methods which are conventional except for the presence of small amounts of finely divided and evenly distributed polyethylene wax or the like in the polymer compositions.

Known polymerization methods are described, for example, in chapter 7 of "Styrene, Its Polymers, Copolymers and Derivatives" by Boundy and Boyer, Reinhold Publishing Corporation, N.Y., 1952, pp. 266–287; in chapters 2 to 6 of "Polymer Processes" by Schildknecht, Interscience Publishers, N.Y., 1956; and in the references cited in the two books. The method which is preferred for use in this invention, suspension polymerization in which expandable beads are prepared directly, is described, i.e., in U.S. Patents 2,888,410 to Buchholz and 2,983,692 to D'Alelio.

This invention also applies to expandable polymer particles produced by methods in which the incorporation of expanding agent is not necessarily integrated with the polymerization, as illustrated in U.S. Patents 2,893,963 to Cleland et al., and 2,885,738 to Henning.

This invention is particularly applicable to polystyrene, the only vinylaromatic polymer of major commercial importance at this time. However, the invention can also be usefully applied in the production of improved cellular products of thermoplastic modified polystyrene, i.e., interpolymers of styrene with other monomers, particularly those interpolymers which contain a major weight proportion of styrene, generally more than 75% and often more than 85% by weight being styrene. Known combinations include interpolymers of styrene in which the co-monomer is a conjugated 1,3-diene, e.g., butadiene or isoprene; an alpha-beta-unsaturated monocarboxylic acid or derivative thereof, such as acrylic acid, methyl acrylate, ethyl acrylate, butyl acrylate, 2-ethylhexyl acrylate, and the corresponding esters of methacrylic acid, acrylamide, methacrylamide, acrylonitrile, methacrylonitrile, etc. The invention is also applicable in the production of expanded cellular products from polymers of vinylaromatic compounds other than styrene, e.g., ortho-, meta- and para-chlorostyrene, vinyl xylenes, vinyl toluenes (ortho-, meta- and paramethylstyrene), meta- and paraethyl styrene, and the like, and to copolymers of styrene with such compounds. It is also applicable to thermoplastic copolymers of the kind disclosed above in which such vinylaromatics are substituted for styrene.

A suitable molecular weight range for polymers used in this invention is between 40,000 and 80,000, as determined by the Staudinger method Polymeric additives which may be used to provide at least some of the advantages of this invention are most broadly classified as polymeric resinous substances which are polymers of vinyl monomers, and preferably hydrocarbons. It is essential that they be substantially immiscible with polystyrene (or other poly(vinylaromatic) in which they are to be used) at temperatures of the order of that at which expansion is to be carried out. Such immiscibility assures the existence of the polymeric additive as discrete particles in the polymer. The temperatures usually employed in expansion are in the range from 90° to 120° C.

It is of course immaterial whether or not the resinous polymeric substance is compatible with the poly(vinylaromatic) compound at temperatures significantly above the expansion temperature. For example, polyethylene wax and polystyrene have a degree of compatibility when the polystyrene is molten. It is only important that the resinous polymeric substance forms a separate, non-continuous phase at temperatures of the order of the expansion temperature.

The resinous additive is preferably present as a finely divided powder having particle sizes comparable to talc. Suitable sizes are, for example, from 0.1 to 10 microns.

By way of example, the following organic resinous polymeric substances have been found to give an improved cellular polystyrene. In each case the polystyrene was prepared by polymerizing styrene monomer, containing the stated quantities of the various substances in dispersion, using a suspension polymerization technique:

| Polymeric substance: | Concentration (in percent by weight) |
|---|---|
| Divinyl benzene/styrene copolymer (made by emulsion polymerization) | 0.075 |
| Polyethylene wax, density 0.945 | 0.1 and 0.5 |
| Ziegler polyethylene (powdered), density 0.945 | 0.1 |
| Ziegler polypropylene (powdered) | 0.1 |
| Polyethylene wax, density 0.960 | 0.1 |
| Polyethylene (Alkathene WVG 23) | 0.1 |
| Polyethylene wax, density 0.918 | 0.1 |

The preferred polymeric substances are polyolefins having a weight average molecular weight of the order of 1,000 to 4,000, more preferably 1,000 to 3,000 and most preferably 1,500 to 2,500. Preferred polyolefins are polypropylenes and polyethylenes, which in this molecular weight range are usually referred to as "waxes." Good results have been obtained with high-density polyethylene waxes (densities between 0.94 and 0.965) having molecular weights of the order of 1,500 to 2,500 and obtained by the Ziegler low-pressure process; low-density polyethylene waxes having a density of the order of 0.92 have also given good results.

Usually less than 0.5% of said polymeric resinous substance is sufficient, depending on the nature thereof. Somewhat larger amounts, e.g., up to 1% may be suitable in some cases. In general, the amount used should not exceed the minimum amount required, in order to avoid the risk of softening the poly(vinylaromatic) compound. Excessive softening can lead to collapse of the resulting expanded particles after expansion. Preferably the poly(vinylaromatic) composition contains 0.01 to 0.5%, more preferably at least 0.05% and less than 0.2% and most preferably less than 0.1% by weight of the resinous polymeric additive.

While the use of polyolefin waxes as additives is generally preferred, the present invention is not limited thereto. Other thermoplastic polymers, and even thermosetting and cross-linked polymers, such as the divinyl benzene/styrene copolymer previously referred to, may be suitable for certain applications, e.g., for the continuous production of cellular polymeric material by extrusion of a polyvinylaromatic compound containing an expanding agent.

The present invention does not exclude the possibility of including additional additives in the polyvinyl-aromatic compounds for known purposes, such for example as flame-retardant additives. These can be added to the cellular material itself, as for example in the case of the conventional antimony oxide/chlorinated hydrocarbon flame-proofing additives, or alternatively added to the monomer prior to polymerization.

The term "expandable" is used herein to refer to poly(vinylaromatic) compositions which, by virtue of a vaporizable expanding agent incorporated therein, are capable of being expanded to an appreciable extent, i.e., to at least 10 times the original volume. The term "pre-expanded" is used herein to refer to a product obtained by expanding an expandable poly(vinylaromatic) composition. Such pre-expanded products are still capable of further expansion, but only to a limited extent, such as occurs when a mass of pre-expanded particles is heated in an enclosed mold. A fully expanded poly(vinylaromatic) composition, such as is obtained by heating a mass of pre-expanded particles, is referred to herein as cellular polymeric material.

The present invention does not depend upon the use of any particular conditions for incorporating the vaporizable expanding agent or on the use of any particular expanding agent of the vaporizable kind. In general any of the substantially inert organic expanding agents are suitable.

Preferred expanding agents are saturated aliphatic hydrocarbons boiling between 10° and 90° C. and, preferably those which are liquid at ambient temperature and normal pressure, i.e., those boiling above 25° C. Most preferred are n-pentane and isopentane or mixtures thereof, e.g., a mixture of 75% n-pentane and 25% isopentane. Butanes, particularly n-butane are also suitable, as are petroleum ethers, hexane, and cyclopentane. Fluorochlorocarbons are also known as expanding agents for polystyrene, e.g., $CCl_2F$—$CClF_2$, which boils at about 48° C.

The present invention does not depend on the use of any particular conditions for effecting expansion to the pre-expanded condition or for preparing shaped articles from pre-expanded poly(vinylaromatic) compositions in particulate form. Any known or suitable methods for achieving these results can be used.

The following examples illustrate but are not to be taken as limiting the present invention:

*Example 1*

Polystyrene containing 0.1% by weight of a hard polyethylene wax having an average molecular weight of 2,000 and a density of 0.92 uniformly dispersed therein is obtained by adding the wax to styrene monomer dispersed in globular form in water with the aid of a bentonite/gelatine suspension stabilizer, the water also containing potassium chloride. The wax-containing styrene is polymerized in suspension with the aid of a peroxide catalyst to form large beads of polystyrene which contain polyethylene wax in even distribution of very small particles. These beads are then formed into expandable beads by adding a mixture of 75% n-pentane and 25% isopentane to a suspension of the beads in hot water. Expansion of these expandable beads by direct steam treatment at 100° C. in an expansion zone produces good homogeneous pre-expanded beads having a more uniform structure in cross-section than similar pre-expanded beads produced in the same manner from polystyrene without the wax additive. In the absence of the wax additive the pre-expanded beads show what has been called "crystallinity" in the art, such crystallinity being due to the presence of large cells, of the order of 130 to 150 microns in diameter. In contrast the polystyrene containing an additive of this invention yield pre-expanded beads of surprisingly small average cell size which are of the order of 80 microns in diameter.

*Example 2*

A polystyrene which contains polyethylene wax is obtained by polymerizing styrene monomer containing 0.1% by weight of a polyethylene wax (density 0.918) in the manner referred to in Example 1. The resulting beads of polystyrene are then impregnated with petroleum ether boiling below 40° C. to form expandable particles containing 6% by weight of petroleum ether.

The resulting expandable particles are expanded by contact with steam for 4 minutes to give pre-expanded particles having an apparent bulk density of approximately 1.2 pounds per cubic foot, which are then matured in air for 24 hours to permit the attainment of normal pressure conditions within the particles by the diffusion of air into them.

As previously indicated, an advantage of the present invention is the reduction of molding time required in the production of shaped articles from expandable particles which results from the presence of the resinous polymeric additive and this is illustrated by the following.

Approximately 1.2 pounds of the matured expandable particles are placed into a cubical mold the sides of which are one foot square. The mold is so constructed that two of its opposing sides are perforated for the admission of steam and one other side is capable of limited movement and forms part of a pressure-recording system for indicating the pressure exerted within the mold by the cellular mass formed from the pre-expanded particles as the result of further expansion and fusion to form a shaped block. Steam is admitted into the mold until the indicated pressure (measuring the pressure exerted by the cellular mass therein) reaches 15 p.s.i.g. The steam supply is then shut off and the interior of the mold put in contact with the atmosphere, through the perforated sides, whereupon the pressure of the cellular material within the mold falls to a safe mold-opening pressure (1 p.s.i.g.) in 25 minutes. After this period the mold is opened and the molded block removed.

*Example 3*

By way of comparison a block is molded from polystyrene prepared in the manner indicated in Example 2 except that no polyethylene wax or similar additive is present. In all other respects the block is prepared following the procedure of Example 2. It is found that even after 35 minutes the pressure of the cellular material within the mold is still too high for satisfactory mold-opening (3 p.s.i.g.) and it is noticed that the pressure within the mold falls much more slowly than in Example 2, indicating a much slower rate of diffusion of gas and vapor out of the cellular material in the absence of the polyethylene wax additive.

*Example 4*

The procedure of Example 1 is repeated using 0.1% by weight of polyvinyl chloride in place of the polyethylene wax. Expanded beads of desirable uniform structure are obtained which show no signs of so-called "crystallinity."

We claim as our invention:

1. A method for producing expanded polystyrene having an average cell diameter below 95 microns, which comprises heating to a temperature between 90° and 120° C. a polystyrene composition containing evenly distributed therein from 0.01 to 0.5 percent by weight of finely divided particles of polyolefin having a weight average molecular weight between 1000 and 4000 and, as a volatile expanding agent, a saturated hydrocarbon boiling between 10° and 90° C.

2. The method according to claim 1 wherein said polyolefin is high density polyethylene having a molecular weight between 1500 and 2500 and said expanding agent has five carbon atoms per molecule.

3. The method according to claim 1 in which said expanded polystyrene is in the form of partially expanded beads, capable of some further expansion.

4. A process for producing molded polystyrene articles which comprises combining beads defined in claim 3 in a closed mold, heating the contents of the mold and maintaining an elevated temperature until expansion and fusion are complete, cooling the contents of the mold until the internal pressure of the molded article is substantially atmospheric, and discharging the molded article.

5. A method for producing an expanded polystyrene having an average cell diameter below 95 microns, which comprises heating to a temperature between 90° and 120° C. a composition of polystyrene containing evenly distributed therein from 0.01 to 0.5 percent by weight of a finely divided polyolefin having a weight average molecular weight between 1000 and 4000 which is substantially immiscible with said polystyrene at said temperature, and a volatile expanding agent boiling between 0° and 90° C.

6. A process for making an expandable polystyrene composition which comprises polymerizing styrene having uniformly dispersed therein 0.01 to 0.5 percent by weight of a polyethylene which has a weight average molecular weight between 1000 and 4000 and which is immiscible with polystyrene at temperatures at which the resulting product is to be expanded, and impregnating the resulting polystyrene with a saturated aliphatic hydrocarbon expanding agent which boils between 10° and 90° C.

7. The process according to claim 6 in which said polymerization takes place in aqueous suspension and results in the production of expandable beads.

References Cited by the Examiner

UNITED STATES PATENTS

| | | | |
|---|---|---|---|
| 2,744,291 | 5/1956 | Stastny et al. | 260—2.5 |
| 2,979,476 | 4/1961 | Bishop et al. | 260—28.5 |
| 2,988,528 | 6/1961 | Tench et al. | 260—28.5 |
| 2,999,828 | 9/1961 | Dannenbrink et al. | 260—28.5 |
| 3,048,551 | 8/1962 | Lutz | 260—28.5 |
| 3,060,136 | 10/1962 | Nelson et al. | 260—2.5 |
| 3,060,138 | 10/1962 | Wright | 260—2.5 |

SAMUEL H. BLECH, *Primary Examiner.*

JAMES A. SEIDLECK, MURRAY TILLMAN,
*Examiners.*